United States Patent [19]
Schalk et al.

[11] Patent Number: 5,475,791
[45] Date of Patent: Dec. 12, 1995

[54] METHOD FOR RECOGNIZING A SPOKEN WORD IN THE PRESENCE OF INTERFERING SPEECH

[75] Inventors: Thomas Schalk; Fadi Kaake, both of Dallas, Tex.

[73] Assignee: Voice Control Systems, Inc., Dallas, Tex.

[21] Appl. No.: 106,072

[22] Filed: Aug. 13, 1993

[51] Int. Cl.$^6$ .................................................. G10L 9/00
[52] U.S. Cl. ........................ 395/2.42; 395/2.62; 395/2.6
[58] Field of Search ............................... 379/80, 88, 410, 379/406, 411; 381/41–45; 395/2.4, 2.42, 2.6, 2.62, 2.79, 2.84

[56] References Cited

U.S. PATENT DOCUMENTS

| | | | |
|---|---|---|---|
| 4,597,098 | 6/1986 | Noso et al. | 395/2.42 |
| 4,645,883 | 2/1987 | Horna et al. | 379/406 |
| 4,914,692 | 4/1990 | Hartwell et al. | 379/410 |
| 5,125,024 | 6/1992 | Gokcen et al. | 379/88 |
| 5,155,760 | 10/1992 | Johnson et al. | 379/67 |

*Primary Examiner*—Allen R. MacDonald
*Assistant Examiner*—Michelle Doerrler
*Attorney, Agent, or Firm*—David H. Judson

[57] ABSTRACT

A method for recognizing a spoken word in the presence of interfering speech, such as a system-generated voice prompt, begins by echo cancelling the voice prompt and any detected speech signal to produce a residual signal. Portions of the residual signal that have been most recently echo-cancelled are then continuously stored in a buffer. The energy in the residual signal is also continuously processed to determine onset of the spoken word. Upon detection of word onset, the portion of the residual signal then currently in the buffer is retained, the voice prompt is terminated, and the recognizer begins realtime recognition of subsequent portions of the residual signal. Upon detection of word completion, the method retrieves the portion of the residual signal that was retained in the buffer upon detection of word onset and performs recognition of that portion. The recognized portions of the word are then reconstructed to determine the spoken word.

9 Claims, 1 Drawing Sheet

METHOD FOR RECOGNIZING A SPOKEN WORD IN THE PRESENCE OF INTERFERING SPEECH

TECHNICAL FIELD

The present invention relates generally to voice processing systems and more particularly to a method of recognizing speech occurring during the playing of system-generated prompts or messages.

BACKGROUND OF THE INVENTION

Voice processing systems for use in conjunction with telephone networks are well known in the prior art. Such systems typically include an announcing means for generating voice messages that are useful in guiding a caller in how to use the system. A voice recognizer is provided to receive and analyze words spoken by the caller. Current systems generally allow the caller to interrupt the voice messages generated by the system by depressing a particular key on the keypad. Once the system-generated voice message is interrupted, the recognizer can readily respond to the input speech. More sophisticated voice processing systems provide voice prompt interruption through detection of word onset when the caller begins to speak. In the latter case, however, the recognizer cannot recognize any speech input to the system spoken while the outgoing message is being played or is being reflected back into the recognizer, generally because of the amplitude of the message reflection relative to that of the spoken input. Thus if the caller speaks as the prompt is made, the speech might stop the prompt but it cannot be adequately recognized and used by the voice processing system. The inability of the prior art systems to recognize that portion of the caller input spoken concurrently during the playing of outgoing messages or prompts is a significant drawback of such systems.

There has therefore been a long-felt need to provide an enhanced technique for use in a voice processing application wherein a caller's speech occurring during outgoing voice messaging can be recognized and used by the voice processing system.

BRIEF SUMMARY OF THE INVENTION

It is thus a primary object of the present invention to recognize a spoken word in the presence of interfering speech.

It is a further object of the present invention to provide a voice processing system wherein an utterance spoken during outgoing voice messaging is recognized and useful in the voice processing system.

It is yet another object of the present invention to provide an enhanced voice processing system that allows a caller's speech to interrupt an outgoing system-generated prompt or message yet still be recognized even if the speech and messaging occur simultaneously.

It is a more specific object of the invention to provide a method, preferably using a single digital signal processor, for recognizing a spoken word in the presence of a system message. Significantly, the technique obviates dedicating a portion of the digital signal processor to provide echo cancellation during the spoken utterance. According to the invention, the system switches "on-the-fly" between echo cancellation and recognition, thereby allowing the processes of echo cancellation and recognition, which are normally decoupled, to be coupled together. The method does not require additional hardware or dedicated DSP's for providing the individual echo cancellation and recognition processes. Further, implementation of the method does not reduce recognition channel capacity where a single recognizer handles multiple telephone lines.

It is a further object of the invention to provide improved voice processing techniques that enable a caller to more effectively use systems with extensive menus. This invention is particularly useful for callers who are familar with the system operation and thus desire to bypass various instructions or sets of instructions.

These and other objects of the invention are provided in a method for recognizing a spoken word in the presence of interfering speech, such as a system-generated voice prompt. In the preferred embodiment, the method uses a single digital signal processor and begins by echo cancelling the voice message and any detected speech signal to produce a residual signal. Portions of the residual signal that have been most recently echo-cancelled are then continuously stored in a buffer. The energy in the residual signal is also continuously processed to determine onset of the spoken word. Upon detection of word onset, the portion of the residual signal then currently in the buffer is retained, the voice prompt is terminated, and the recognizer begins realtime recognition of subsequent portions of the residual signal. Upon detection of word completion, the method retrieves the portion of the residual signal that was retained in the buffer upon detection of word onset and performs recognition of that portion. The recognized portions of the word are then reconstructed to determine the spoken word.

The foregoing has outlined some of the more pertinent objects of the present invention. These objects should be construed to be merely illustrative of some of the more prominent features and applications of the invention. Many other beneficial results can be attained by applying the disclosed invention in a different manner or modifying the invention as will be described. Accordingly, other objects and a fuller understanding of the invention may be had by referring to the following Detailed Description of the preferred embodiment.

BRIEF DESCRIPTION OF THE DRAWINGS

For a more complete understanding of the present invention and the advantages thereof, reference should be made to the following Detailed Description taken in connection with the accompanying drawings in which.

Similar reference characters refer to similar parts and/or steps throughout the several views of the drawings.

DETAILED DESCRIPTION

Although the preferred embodiment of the invention is described in the context of recognizing a spoken utterance during the playing of system-generated voice prompts, it should be appreciated that the invention is useful in any voice recognition applications wherein it is desirable to recognize a spoken word in the presence of interfering speech, regardless of the nature of such speech. Moreover, while the preferred embodiment illustrates the inventive method in the context of a voice processing system used with a telephone network, the techniques of the invention are not so limited. The method is useful in any voice recognition application regardless of the particular environment whenever it is necessary to recognize a spoken word in the presence of interfering speech.

Figure 1:
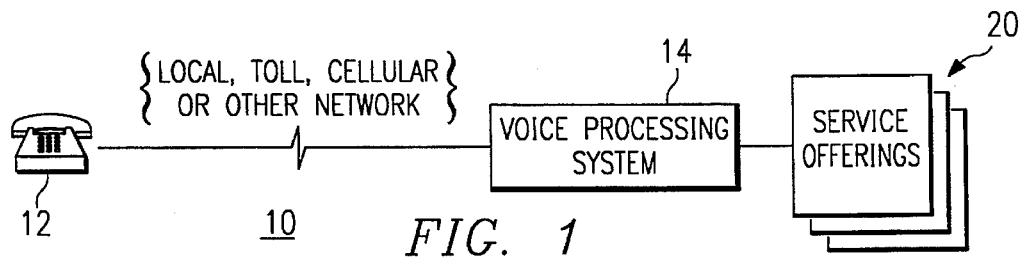
FIG. 1 is a schematic diagram of a telephone network having a calling station connectable to a voice processing system of a service provider such as a financial institution.

FIG. 1 illustrates a block diagram of a conventional telephone network 10 having a calling station 12 connectable (via a local, toll or non-wire line) to a voice processing system 14 of a financial institution. The particular aspects of the voice processing system 14 are not critical but, for explanation purposes, the system includes a voice recognition algorithm and, if desired, an associated voice verification algorithm 50 to facilitate voice-controlled access to one or more services 20 offered by the financial institution. These services include, but are not limited to, account balance inquiry and electronic funds transfer. Moreover, while the following discussion describes the use of voice processing in the context of accessing information stored in a financial institution, it should be appreciated that the teachings of the invention are not so limited. The invention can be used for numerous other applications such as credit card validation, order-entry of goods/services and personal identification validation. Further, it should also be appreciated that the telephone network may include other devices and switching systems conventional in the art. Accordingly, calling station 12 may be connected through a central office or other switching device, such as an access tandem or interexchange carrier switching system, before connection to the service provider. Further, the method may be implemented outside the telephone network environment.

Figure 2:
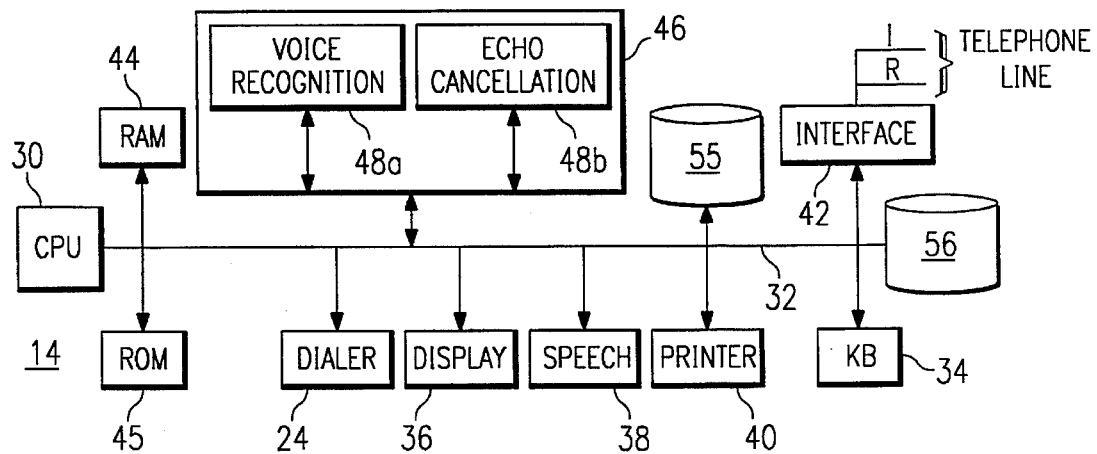
FIG. 2 is a schematic diagram of the voice processing system of FIG. 1 for use in providing a method for recognizing a spoken word in the presence of interfering speech according to the teachings of the present invention.

Referring now to FIG. 2, a simplified block diagram is shown of an exemplary voice processing system 14 of the present invention in which a method for recognizing a spoken word in the presence of interferring speech is implemented. The system includes a digital signal processor (DSP) 30 to control the overall operation of the system and, more importantly, to facilitate "on-the-fly" switching between echo cancellation and recognition processes as will be described. The CPU 30 includes data, address and control busses represented generally by the reference numeral 32. As seen in FIG. 2, the system 14 also includes conventional input/output devices such as a keyboard 34, display terminal 36, speech generator 38 and printer 40. Speech generator 38, which may be implemented in software, is used to provide voice messages or prompts that are useful in guiding the caller in use of the system. Such messages or prompts (hereinafter referred to "messages" for convenience) typically include menu selections and instructions although the particular types of messages can vary greatly.

A communications interface 42 (which may be microprocessor-controlled) interfaces the system to the telephone line. Random access memory ("RAM") 44 is connected to the CPU by bus 32 for providing temporary storage of data processed thereby. A portion of the RAM 44 is dedicated as a buffer for the purposes to be described below. Read only memory ("ROM") 45 is likewise connected to the digital processor for providing permanent storage of special recognition and verification data. Disk storage 46 supports control software programs including a voice recognition algorithm 48a, an echo cancellation algorithm 48b and, if desired, a voice verification algorithm (not shown). The system 14 may also include a transaction databases for storing financial and transaction data, such as account balances, credit information and the like. This information is preferably stored at predetermined locations addressed by the caller's password. Thus the password identifies both the caller and the location of the data sought to be accessed.

In operation of the preferred method, assume a caller places a call from the calling station 12 to the financial institution in order to access account information. Once the call setup has been established, the speech generator 38 of the digital processing system 14 prompts the caller by providing menu selections. The method of the invention is then responsive to spoken inputs by the caller to interrupt the system-generated message and recognize the speech even if the speech and system message occur simultaneously.

Figure 3:
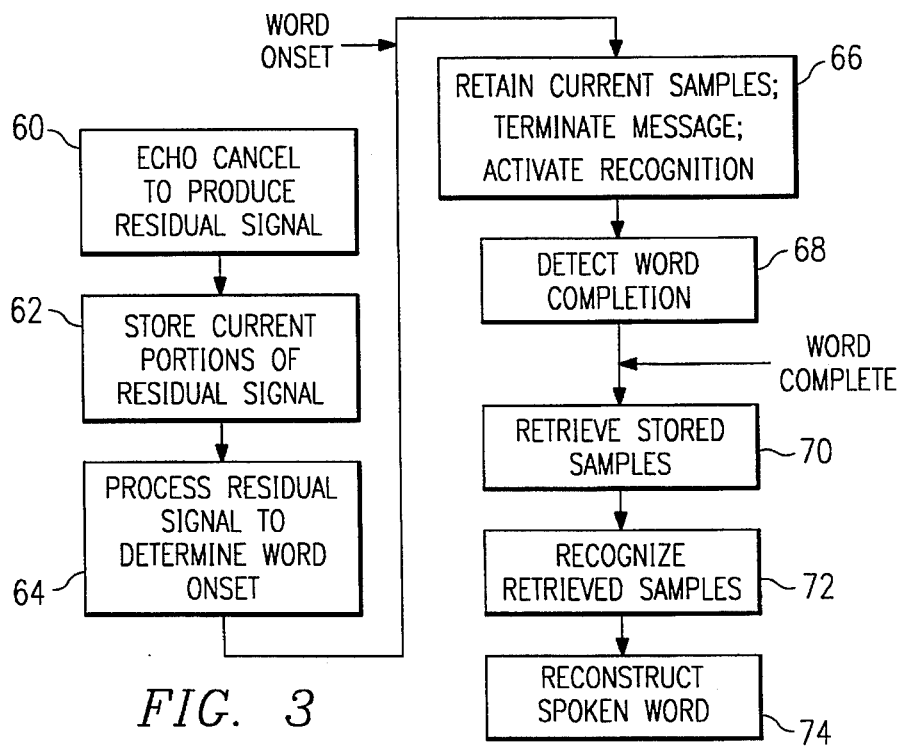
FIG. 3 is a flowchart describing the inventive method of the present invention.

Referring now to FIG. 3, a simple flowchart is shown detailing the preferred method of the present invention for recognizing a spoken word in the presence of a system-generated voice prompt. The method is implemented in the voice processing system of FIG. 2 or any other suitable voice processing system. The method begins at step 60 by echo cancelling the voice prompt and any detected speech signal to produce a residual signal. This step is effected by the echo cancellation algorithm 48b which is run by the DSP. Any suitable echo cancellation technique can be used, and it is desired that the residual signal output from the echo cancellation be small relative to the signal strength of the caller's spoken word. At step 62, portions of the residual signal that have been most recently echo-cancelled are then continuously stored in the buffer of RAM 44 or other suitable memory. The method continues at step 64 (which occurs in tandem with step 62) to continuously process the energy in the residual signal to determine "onset" of the spoken word. Although not meant to be limiting, preferably "word onset" is effected by software which controls the DSP to calculate a root mean square (RMS) value of the residual signal and then to compare this RMS value to a predetermined threshold as is known in the art. When the RMS value exceeds the threshold, word onset is said to occur. The use of the phrase "word onset" is used here for convenience and should not be taken as limiting the scope of the present invention as any portion of the spoken word can be used as the trigger to cease the message prompt and then begin the recognition as will be described below. Of course, other techniques for determining word onset are likewise within the scope of the present method.

Upon detection of word onset, the method continues at step 66 wherein three separate functions occur. First, the portion of the residual signal then currently in the buffer is retained for later processing in a substantially non-realtime manner. Second, the voice prompt is terminated such that subsequent portions of the residual signal consist essentially of the spoken word. Third, the recognizer is activated to begin realtime recognition of subsequent portions of the residual signal. Although not meant to be limiting, the recognizer preferably performs recognition through a feature extraction technique as described in U.S. Pat. No. 5,127,043 titled "Simultaneous Speaker-independent Voice Recognition And Verification Over A Telephone Network," issued Jun. 30, 1992, and incorporated herein by reference. Alternatively, the recognition is performed using a template matching technique as well-known in the art. The particular type of recognition strategy, whether speaker-dependent or independent, or whether discrete or continuous, is not critical to the invention and it is envisioned that any such strategy is useful with the inventive method.

The method continues at step 68 to detect word completion, which will typically occur as a triggering event in the recognition strategy as implemented in U.S. Pat. No. 5,127, 043. Any other conventional technique for determining the end of the spoken word is likewise suitable for use in the invention. Upon detection of word completion, the recognizer has already recognized the subsequent portions of the residual signal and thus, effectively, a portion of the spoken word. To complete the recognition, the method continues at step 70 to retrieve the portion of the residual signal that was retained in the buffer upon detection of word onset. At step 72, that portion of the residual signal that was retained in the buffer is then itself recognized by the recognition algorithm. In effect, step 72 recognizes the portion of the spoken word used to detect word onset and such recognition is effectively done in a non-realtime manner because it is preferably carried out after word completion is detected. At step 74, the recognized portions of the residual signal are then essentially reordered, with the portion of the residual signal recognized in step 72 placed in front of the portions of the residual signal recognized in step 66. The reconstructed word can then be used by the voice processing system.

Thus, according to the invention, signals input to the voice recognizer digital signal processor (DSP) include a reflected version of the outgoing message and, potentially, some input spoken by the caller. The outgoing message gets reflected back to the recognizer generally due to line impedance mismatches or the like. The recognizer DSP performs echo cancellation and generates a residual signal, which is an echo cancelled version of the received input(s) to the recognizer. The RMS energy in the residual signal is measured and compared to a predetermined threshold value. When the predetermined threshold value is exceeded, the DSP generates a control output indicating that "word onset" has occurred.

While the DSP is performing echo cancellation, samples of the residual signal are continuously buffered in a memory. The memory preferably store a predetermined number of samples (e.g., 0.5 milliseconds worth) in a first in, first out manner such that only the most recently processed portion of the residual signal is present in the buffer at any time. When word onset occurs, the outgoing message is stopped and the recognizer is turned on to begin realtime feature extraction. At the same time the current samples of the residual signal are retained and no further samples are added to or removed from the buffer. Feature extraction of the spoken input then continues until the recognizer locates the end of the word being spoken. At such time as the recognizer locates the end of the word, the DSP retrieves the samples in the buffer and performs feature extraction on these samples. The process locates the beginning of the word and then combines this information with the information recognized previously to determine the spoken input.

Therefore according to the invention the recognizer reconstructs the spoken word by going back and performing feature extraction on those samples which were first used to determine word onset. This technique advantageously enables recognition of spoken words in the presence of interfering speech. The method facilitates voice prompt interruption but still allows recognition even when system-generated messages and speech occur simultaneously.

Significantly, the technique described herein obviates dedicating a portion of the digital signal processor to provide echo cancellation during the entire spoken utterance. The method does not require additional hardware or dedicated DSP's for providing the individual echo cancellation and recognition processes; rather, the system switches "on-the-fly" between echo cancellation and recognition. The invention thus allows the processes of echo cancellation and recognition, which are normally decoupled, to be coupled together. Moreover, implementation of the method does not reduce recognition channel capacity where a single recognizer handles multiple telephone lines.

If desired, adaptive filter parameters (which are used in echo cancellation) are also stored as a function of time in a circulating buffer. When word onset is detected, the parameters are "reset" to what they were at a predetermined time (e.g., 200 milliseconds earlier) to facilitate subsequent echo cancellation.

It should be appreciated by those skilled in the art that the specific embodiments disclosed above may be readily utilized as a basis for modifying or designing other structures for carrying out the same purposes of the present invention. It should also be realized by those skilled in the art that such equivalent constructions do not depart from the spirit and scope of the invention as set forth in the appended claims.

What is claimed is:

1. A method for recognizing a spoken word in the presence of a voice message generated by a voice processing system, the voice processing system having a speech recognizer, comprising the steps of:

(a) echo cancelling the voice message and any detected speech signal to produce a residual signal;

(b) processing the residual signal to detect a first portion of the spoken word;

(c) upon detection of the first portion of the spoken word, storing the portion of the residual signal including the first portion of the spoken word that has been most recently processed at the time of such detection, stopping echo cancelling of the voice message and any detected speech signal and initiating speech recognition of a second portion of the spoken word;

(d) thereafter initiating speech recognition of the stored first portion of the spoken word; and (e) combining results of the speech recognition effected in steps (c) and (d) to determine the spoken word.

2. The method as described in claim 1 further including the step of ceasing the voice message upon detection of the first portion of the spoken word.

3. The method as described in claim 1 further including the step of detecting completion of the spoken word prior to initiating speech recognition of the stored first portion of the spoken word.

4. The method as described in claim 1 wherein the recognition of the second portion of the spoken word occurs in realtime.

5. The method as described in claim 1 wherein the step of echo cancelling further includes thee steps of estimating an energy level in the residual signal and comparing the estimated energy level to a predetermined threshold energy level.

6. A method for recognizing a spoken word in the presence of a voice message generated by voice processing system, the voice processing system having a speech recognizer, comprising the steps of:

(a) echo cancelling the voice message and any detected speech signal to produce a residual signal;

(b) continuously storing a portion of the residual signal that has been most recently echo cancelled;

(c) processing the residual signal to detect a first portion of the spoken word;

(d) upon detection of the first portion of the spoken word, retaining the stored portion of the residual signal including the first portion Of the spoken word that has been most recently processed at the time of such detection, ceasing the voice message, stopping echo cancelling of the voice message and any detected speech signal and initiating speech recognition of a second portion of the spoken word;

(e) thereafter initiating speech recognition of the first portion of the spoken word retained upon detection of the first portion of the spoken word; and (f) combining results of the recognition effected in steps (d) and (e) to determine the spoken word.

7. The method as described in claim 6 further including the step of detecting completion of the spoken word prior to initiating speech recognition of the retained first portion of the spoken word.

8. The method as described in claim 6 wherein the recognition of the second portion of the spoken word occurs in realtime.

9. A method, using a single digital signal processor, for recognizing a spoken word in the presence of interfering speech, comprising the steps of:

(a) echo cancelling the interfering speech and any detected speech signal with the single digital signal processor to produce a residual signal;

(b) continuously storing a portion of the residual signal that has been most recently echo cancelled;

(c) processing the residual signal to detect a first portion of the spoken word;

(d) upon detection of the first portion of the spoken word, retaining the portion of the residual signal including the first portion of the Spoken word that has been most recently processed at the time of such detection, ceasing the interfering speech and switching the single digital signal processor from echo cancelling of the interfering speech to speech recognition of a second portion of the spoken word;

(e) detecting completion of the spoken word;

(f) upon detection of completion of the spoken word, initiating speech recognition of the retained first portion of the spoken word; and (g) combining results of the speech recognition effected in steps (d) and (f) to determine the spoken word.

* * * * *